Dec. 27, 1960     R. H. WISE     2,966,069
MOTION CONVERSION UNIT
Filed Sept. 26, 1955     4 Sheets-Sheet 1
FIG_1
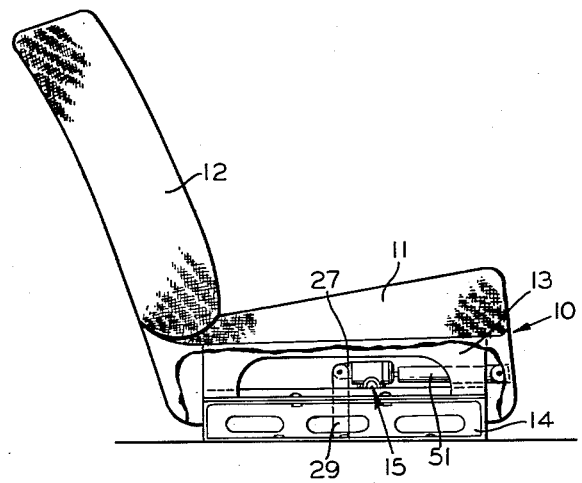
FIG_2
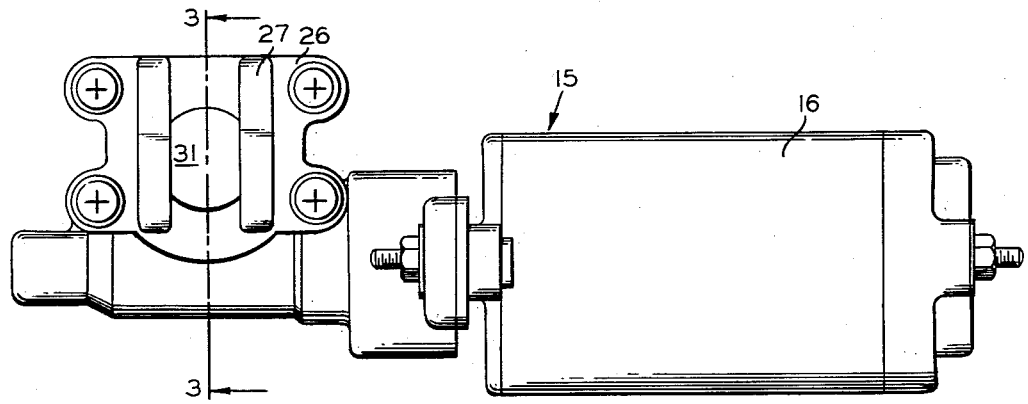
*INVENTOR.*
RALPH H. WISE
BY H. P. Settle Jr.
Wesley B. Taylor
Charles S. Penfold
ATTORNEYS Dec. 27, 1960
R. H. WISE
2,966,069
MOTION CONVERSION UNIT
Filed Sept. 26, 1955
4 Sheets-Sheet 2
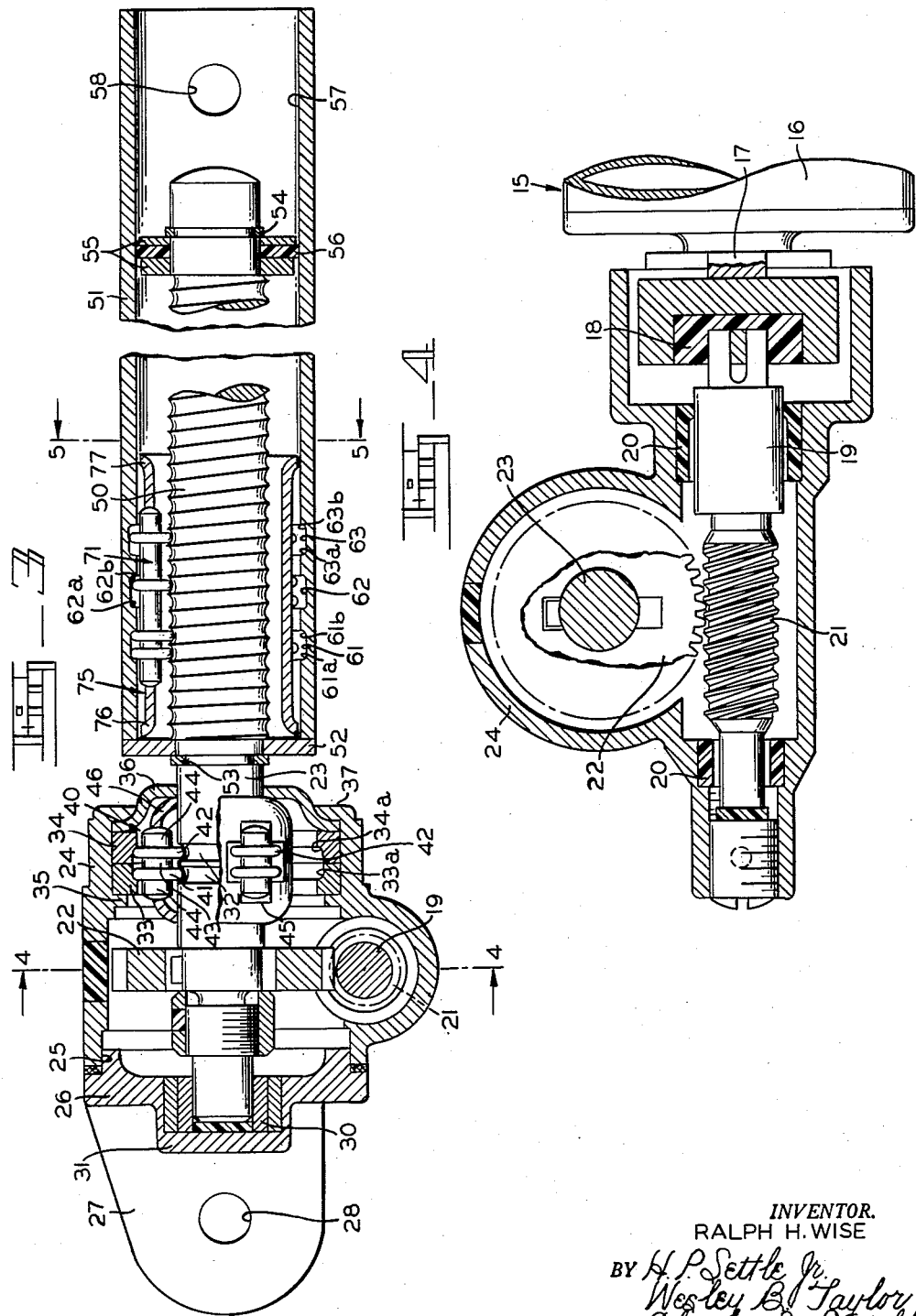
INVENTOR.
RALPH H. WISE
BY H. P. Settle Jr.
Wesley B. Taylor
Charles S. Penfold
ATTORNEYS

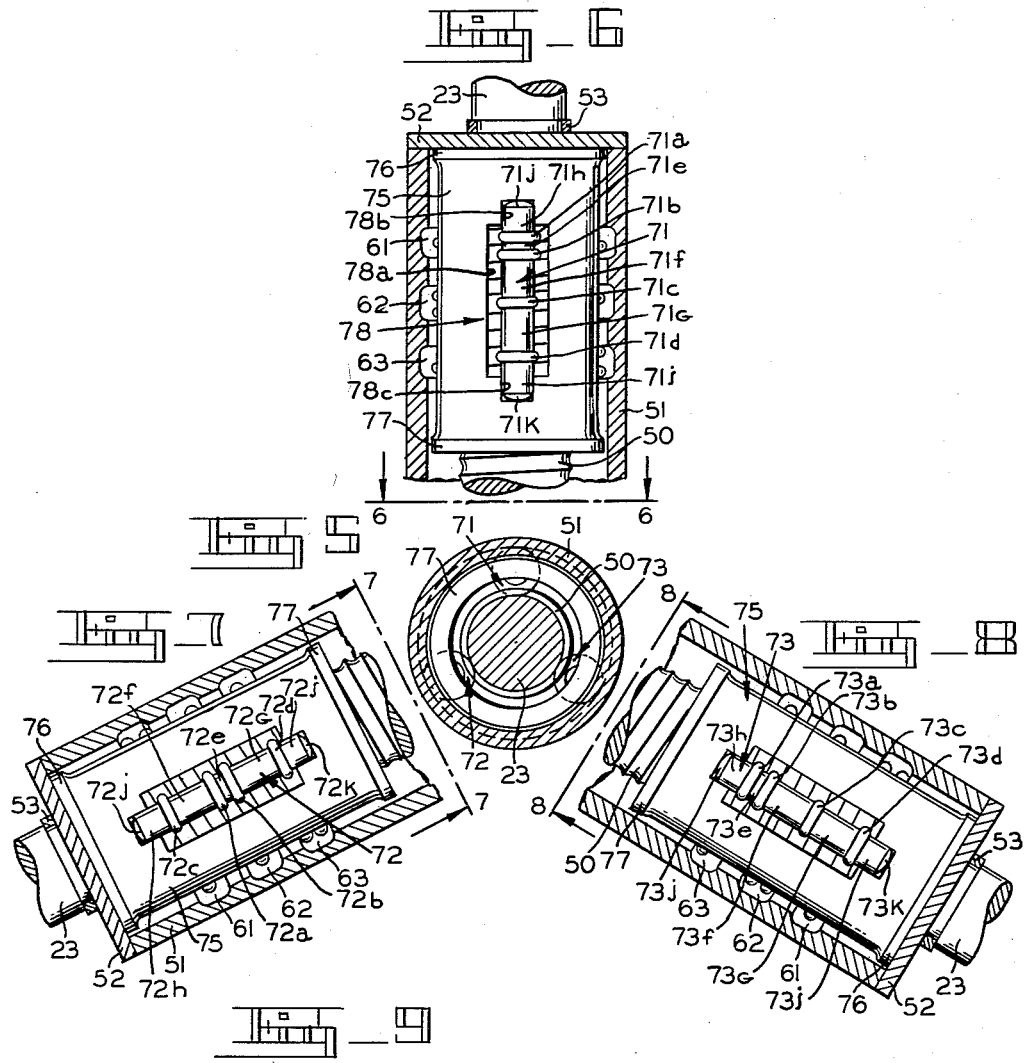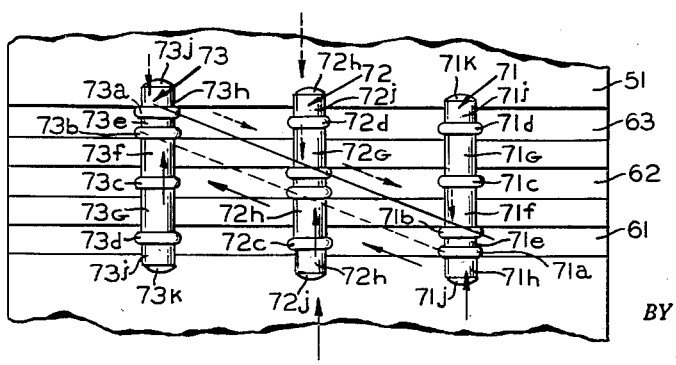

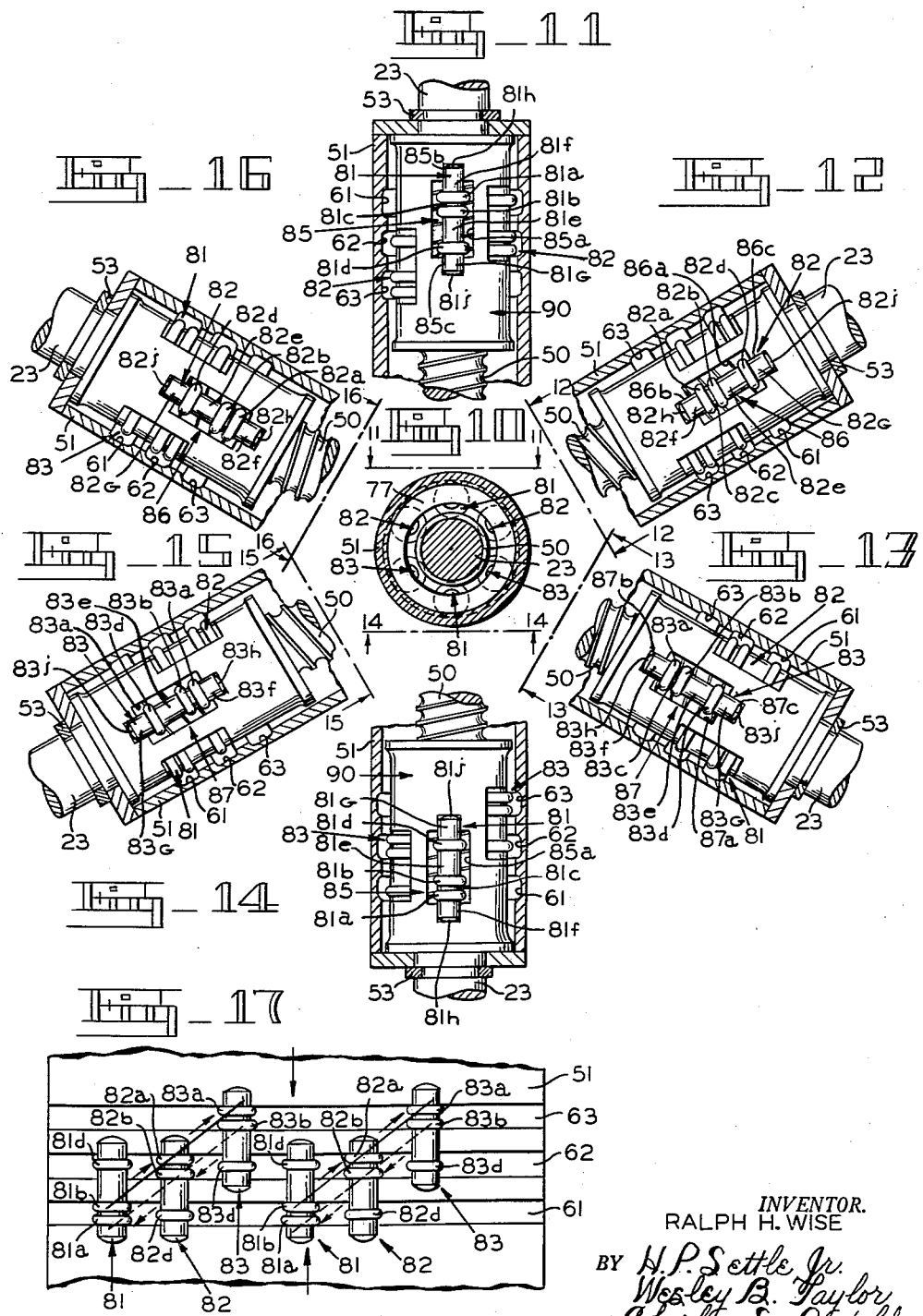

United States Patent Office
2,966,069
Patented Dec. 27, 1960

1

2,966,069

MOTION CONVERSION UNIT

Ralph H. Wise, Gary, Ind., assignor, by mesne assignments, to The Anderson Company, a corporation of Indiana Filed Sept. 26, 1955, Ser. No. 536,515

5 Claims. (Cl. 74—424.8)

The present invention relates to a motion-conversion unit and, more particularly, to a unit for converting rotary motion to translatory motion, or vice versa.

The present invention is particularly illustrated and described for utilization as an actuator for a vehicular seat, as for power fore-and-aft adjustment of an automobile seat. However, it will be appreciated that the present invention is capable of being utilized for many different purposes, such as the actuation of the top of a convertible vehicle, the actuation of a tractor lift mechanism, and the like.

For the conversion of rotary motion to translatory motion, or vice versa, for the purposes hereinbefore described, there have been previously available various types of nuts. One such nut is known as the "Acme" nut which comprises merely a threaded nut for reception by a threaded shaft for movement along the shaft as the shaft is rotated. The very low efficiency of this type of actuating mechanism has resulted in the development of various types of ball-bearing nuts. One type of ball-bearing nut utilizes a great number of circulating balls which operate between the thread and a surrounding collar, the balls being recirculated through a tube or other channel to the nut. This type of unit is in use today in some types of seat adjusters, but the high cost and the large size of such units, as is necessary to accommodate the recirculation of the balls, has seriously hindered further and broader use of this type of actuating mechanism. Another type of ball nut is known as the "caged" ball nut in which the balls are disposed in an apertured carrier which rotates during travel of the balls along the thread, the cage accommodating freewheeling of the tubular actuated member at either end of the stroke. This type of assembly is also in use in seat-adjusting mechanisms at the present time, although the cost and difficulty of assembling such devices have limited their use. Another common disadvantage to all of the hereinbefore described types of nuts has been the necessity of utilizing a relatively complicated gear-reduction unit capable of reducing the speed of rotation of the threaded actuating shaft.

The present invention now provides an improved power-conversion unit which is simple in structure, which eliminates the great number of ball-bearing elements necessary in both the recirculating ball-type nut and the caged ball-type nut, and which utilizes a planetating carrier and rotatable element construction to provide an appreciable speed reduction within the actuating mechanism itself, thereby reducing the speed reduction which must take place within the speed-reduction gearing, or possibly completely eliminating the speed-reduction gearing under those conditions at which very large speed reduction is not necessary.

Structurally, the present invention comprises concentric, preferably telescopic, driving and driven members, one of the members being provided with a peripheral thread and the other of the members being provided with a peripheral thrust shoulder. When the unit is utilized to convert rotary motion to translatory motion, the threaded member is preferably the driving shaft, and the driven member is preferably a sleeve which telescopically receives the shaft and which is provided with an interior peripheral recess providing a thrust shoulder. Interposed between the driving and driven members are a plurality of rotatable elements which are in both radial and axial thrust relation to the two members and which serve to interconnect the two members for relative movement. The rotatable elements are preferably carried by a carrier which is rotatable concentrically with the driving and driven members and which maintains the rotatable elements in axial parallelism with the driving and driven members.

The concentric driving and driven members are relatively rotatable and relatively axially movable about a central axis, the rotatable members planetate about the central axis and are individually rotatable about axes parallel to this central axis. Due to the planetating action of the rotatable elements, a speed change between the driving member and the driven member is obtained, preferably a speed reduction. The engagement of the rotatable elements with the shoulder of the driven member, as in a unit for translating rotary motion into longitudinal or translatory motion, serves to move the driven member axially with respect to the driving member at a rotational speed which is proportional to, but preferably less than, the speed of rotation of the driving member.

The rotatable elements take the form of elongate thrust units having radially enlarged, preferably toroidal, surface portions which are in engagement with the threads of the one member and which are in engagement with the shoulder of the other member. The rotatable elements support the two members in full radial and axial thrust engagement with the driving and driven members, the preferably toroidal surface contour of the rotatable elements accommodating radial and thrust loads at substantially point-to-point contact between the two members.

It is, therefore, an important object of the present invention to provide an improved motion-converting mechanism for changing rotary motion into translatory motion, or vice versa.

Another important object of the present invention is the provision of an improved speed-changing and motion-translating device wherein telescoping driving and driven members are interconnected through individual rotating elements in full radial and axial thrust engagement with each of the members.

It is a further object of this invention to provide an improved motion-converting drive unit wherein telescopic driving and driven members, one of which is threaded and the other of which has an annular thrust shoulder, are interconnected through a rotatable element interposed between the members and in full axial and radial thrust engagement therewith, the driving and driven members of the rotatable element forming a planetating unit capable of changing the relative speeds of the driving and driven member while simultaneously translating the rotational motion of the driving member into translatory motion of the driven member, or vice versa.

Still another important object is the provision of a power-transmission unit including coaxial and telescopic driving and driven members interconnected through a rotatable element interposed between the members and having a toroidal contacting surface in radial and axial thrust relation to both of the members.

Yet another object of the present invention is to provide a motion-conversion unit wherein telescopic, coaxial driving and driven members are interconnected by a plurality of rotatable elements in radial and axial thrust relation to the members and joined by a carrier also interposed between the members, the elements being capable of planetating motion about the common axis of the members and rotational motion about individual axes parallel to the common axis to translate the motion of the driving member into the motion of the driven member and to concurrently change the relative speeds of the members.

Other and further objects of the present invention will become apparent from a study of the detailed description of the invention hereinafter set forth and the appended drawings.

In the drawings:

Figure 1 is a side elevational view of a vehicular seat, with parts broken away, utilizing an actuating device of the present invention;

Figure 2 is an enlarged elevational view of the actuating device of Figure 1;

Figure 3 is an enlarged sectional view taken along the plane 3—3 of Figure 2;

Figure 4 is a sectional view, with part shown in elevation, taken along the plane 4—4 of Figure 3;

Figure 5 is a sectional view taken along the plane 5—5 of Figure 3;

Figure 6 is a sectional view taken along the plane 6—6 of Figure 5;

Figure 7 is a sectional view taken along the plane 7—7 of Figure 5;

Figure 8 is a sectional view taken along the plane 8—8 of Figure 5;

Figure 9 is an enlarged developed view illustrating the axial thrust forces acting upon the rotatable elements of the device illustrated in Figures 1–8, inclusive;

Figure 10 is a view similar to Figure 5, but illustrating a modified form of actuating device of the present invention;

Figure 11 is a sectional view taken along the plane 11—11 of Figure 10;

Figure 12 is a sectional view taken along the plane 12—12 of Figure 10;

Figure 13 is a sectional view taken along the plane 13—13 of Figure 10;

Figure 14 is a sectional view taken along the plane 14—14 of Figure 10;

Figure 15 is a sectional view taken along the plane 15—15 of Figure 10;

Figure 16 is a sectional view taken along the plane 16—16 of Figure 10;

Figure 17 is a view similar to Figure 9 illustrating the forces acting on the rotatable elements of the device illustrated in Figures 10–16, inclusive.

As shown in the drawings:

In Figure 1, reference numeral 10 refers generally to a vehicular seat including a seat cushion 11 and a back cushion 12 which are supported on an upright frame member 13. The frame member 13 is supported for longitudinal movement along a track member 14.

The seat frame element 13 is movable along the track 14 by a power-actuating device indicated generally at 15 and best illustrated in Figures 2, 3 and 4. The actuating mechanism includes an electric motor or the like 16 (Figure 4) having a rotatable output shaft 17 which is connected through a flexible coupling 18 to an output shaft 19. The shaft 19 is journaled in plain bearings 20, preferably formed of nylon, and of the type described and claimed in more detail in my copending application Serial No. 503,719, filed April 25, 1955. The medial portion of the shaft 19 is in the form of a worm gear 21 (Figure 4), the helical teeth of the worm gear 21 meshing with a pinion 22 which is supported by a driving shaft 23 which forms the input shaft of the power-translation unit of the present invention. It will be noted from Figures 3 and 4 that the shaft 19 and the shaft 23 are journalled in a metallic housing 24, preferably die-cast, and open at one end, as at 25, the open end of the housing 25 being closed by a cap 26 having laterally spaced ears 27 which are provided with laterally aligned apertures 28 for disposing the actuating mechanism upon an upright support 29 (Figure 1).

From Figure 3, it will be seen that one extreme end of the shaft 23 is journaled in a plain bearing 30 which is positioned in an open-ended cup 31 integral with the housing cap 26. The pinion 22 is fixedly mounted upon a medial portion of the shaft 23 within the housing 24 and that end of the shaft 23 remote from the end journaled in the bearing 30 projects axially beyond the confines of the housing 24. Adjacent to pinion 22, and toward that side of the shaft 23 which projects freely beyond the housing 24, the shaft is provided with a pair of adjacent, identical peripheral bearing grooves 32 which are generally concave and of identical contour. The grooves 32 are medially aligned with a pair of axially abutting outer bearing races 33 and 34. These bearing races 33 and 34 are annular in contour and are provided with annular, inner, axially spaced, generally radial shoulders 33a and 34a, respectively. These bearing raceways are inserted into the housing 24 through the adjacent open end of the housing, and the axially inner bearing race 33 abuts an annular, radially inwardly directed abutment shoulder 34 formed integrally with the housing. After insertion of the raceways 33 and 34, a bearing cap 36 is inserted in the open end of the housing 24 and the housing is then deformed radially inwardly, as at 37, to overlie the cap 36 and to retain the bearing races 34 in assembled relation bottomed against the annular shoulder 35.

Interposed between the bearing races 33 and 34 and the race grooves 32 of the shaft 23 are a plurality, preferably three, of bearing elements 40. The bearing elements 40 are generally cylindrical in shape and are provided with radially enlarged, generally toroidal bearing surface portions 41 and 42, respectively. The bearing portions 41 and 42 are axially spaced by reduced diameter portion 43 to such an extent that the bearing portion 41 snugly abuts the annular shoulder 33a of the race 33, while the bearing portion 42 snugly abuts the annular shoulder 34a of the bearing race 34. It will be noted that the reduced portion 34 bridges both the line of contact between the two bearing races and that shaft portion joining the two grooves 32.

The bearing elements 40 are provided with terminal, axially aligned trunnions 44, the trunnions projecting into apertures 45 formed in a bearing retainer 46. The annular retainer 46 surrounds a portion of the shaft 23 to either side of the grooves 32. Thus, the projecting end of the shaft 23 is supported within the housing 24 by the antifriction radial and axial thrust-bearing elements 40 which are interposed between the bearing races 33, 34 and the race grooves 32 of the shaft itself. The toroidal portions 41 and 42 of the bearing elements 40 support the shaft against both axial thrust and radial load in much the same manner as the bearing described and claimed in detail in the copending application of John W. Anderson, Serial No. 512,464, filed June 1, 1955, now Patent No. 2,914,366, issued November 24, 1959.

That portion of the shaft 23 which projects beyond the housing 24 is provided with an exterior peripheral helical thread 50 of appreciable axial lead. The threaded portion 50 of the shaft 23 is axially received in a tubular, generally cylindrical, housing 51. The housing 51 is axially movable relative to the shaft 50 in a manner to be hereinafter more fully described, and axial movement of the tubular element 51 toward the shaft housing 24 is limited by a radially enlarged flange 52 affixed to the shaft 23 between a snap ring 53 positioned in a shaft groove exterior of the housing 24 and the enlarged, terminal, threaded portion of the shaft 23. The extreme free end of the shaft 23 is grooved to receive a second snap ring 54 which serves to confine a pair of radially extending plates 55 between the enlarged threaded portion 50 of the shaft and the snap ring 54. Interposed between the plates 55 is a radially enlarged wear plate 56, preferably formed of nylon or the like, and which contacts the inner peripheral surface 57 of the tubular member 51 to guide the tubular member 51 upon the shaft. The free end of the tubular member 51 is provided with a pair of radially opposed apertures 58 which are adapted for attaching the tubular element 51 to the seat-supporting structure.

The tubular member 51 is provided with a series of equally axially spaced interior recesses 61, 62 and 63 (Figures 3 and 5–9, inclusive). The recesses 61, 62, 63 each provide a pair of radially directed, interior shoulders 61a, 61b, 62a, 62b, 63a, 63b for a purpose to be hereinafter more fully described.

It will be appreciated that the tubular member 51 telescopically receives the threaded portion 50 of the shaft 23; the shaft portion 50 and the tubular member 51 being concentric and relatively axially and rotationally movable.

Interposed between the concentric shaft portion 50 and tubular element 51 are a plurality of rotatable, motion-transmitting elements indicated generally at 71, 72 and 73. These elements 71, 72 and 73 are illustrated in detail in Figures 6–9, inclusive. In these figures it will be seen that the elements 71 and 73 are identical, while the element 72 differs from the elements 71 and 73. More particularly, elements 71, 72 and 73 each are of elongate, generally cylindrical contour, but are provided with a plurality of radially enlarged, bulbous, preferably toroidal thrust-transmitting surfaces. These toroidal transmitting surfaces are indicated for the element 71 in Figure 6 as including a pair of relatively closely spaced toroidal surfaces 71a, 71b, a single medial toroidal surface 71c, and another single toroidal surface 71d adjacent the end of the element 71 remote from the surfaces 71a and 71b. The pair of closely spaced surfaces 71a and 71b are separated by a reduced diameter portion 71e, the surfaces 71b and 71c are separated by a reduced diameter portion 71f, and the surfaces 71c and 71d are separated by a reduced diameter portion 71g. The element 71 terminates in reduced end portions or pintles 71h and 71i having arcuate, convex extremities 71j and 71k.

The element 73 is identical to the element 71 heretofore described and the reference numerals 73a–73k refer to identical portions of the element. However, the relative position of the element 73 in the assembly is reversed, i.e. the closely spaced toroidal surfaces 71a and 71b of the element 71 are adjacent the flange 52 of the shaft 23, while the surfaces 73a and 73b are remote from the flange 52.

The element 72 is slightly different from the elements 71 and 73, in that the closely spaced surfaces 72a and 72b are located medially of the element, while the single surfaces 72c and 72d are located adjacent either extremity thereof.

By this arrangement it will be seen that the closely spaced surfaces 71a and 71b are so located as to be enterable in the groove 61 of the tubular element 51, the surfaces 72a and 72b are enterable in the recess or groove 62, and the surfaces 73a and 73b are enterable in the groove 63.

The closely spaced surfaces 71a and 71b, 72a and 72b, and 73a and 73b are spaced so that the toroidal surfaces thereof snugly fit within the corresponding grooves 61, 62 and 63, respectively. The shoulders 61a and 61b tightly receive the surfaces 71a and 71b thereagainst in axial and radial thrust relation, while the same surfaces straddle a crest of the thread 50 to abut the thread to either side of the crest in radial and axial thrust relation to the thread. Similarly, the surfaces 72a and 72b cooperate with the shoulders 62a and 62b and the thread 50, while the surfaces 73a and 73b cooperate with the shoulders 63a and 63b and the thread 50.

It will be noted that the rotatable elements 71, 72 and 73 are rotatable about their longitudinal axes. These elements 71, 72 and 73 must be retained in position, so that the axes of the elements are parallel to the axis of rotation of the thread 50 and the axis of rotation of the tubular member 51. Of course, the interpositioning of the toroidal portions of the elements in the grooves 61, 62 and 63 will aid in retaining the elements in such parallelism, but to prevent any misalignment whatsoever of the elements, the elements are retained by a carrier indicated generally at 75.

This carrier 75 is generally tubular in configuration and is of a radial dimension intermediate that of the element 51 and the threaded shaft portion 50, so as to be interposed therebetween. The generally cylindrical carrier 75 is provided with radially outwardly deformed terminal portions 76 and 77 which terminate in annular edges lying in closely spaced relation to the tubular element 51, so that the tubular carrier is guided by the element 51 for only axial movement, and is retained against tilting or tipping movement. Carrier 75 is provided with a plurality of peripherally spaced apertures 78 which are of generally cruciform contour, including a central, generally rectangular opening 78a which communicates with somewhat smaller openings 78b and 78c at either axial extremity of the aperture 78a. The central aperture portion 78a is of a peripheral extent sufficient to provide appreciable clearance for the radially enlarged toroidal portion of the elements 71, 72 and 73, respectively, while the reduced terminal aperture portions 78b and 78c snugly receive the terminal extremities of the rotatable elements, as for example the extremity 71h and 71i of the element 71, the convex terminal portions 71j and 71k abutting the portion of the carrier 75 defining the marginal edge of the aperture portions 78b and 78c.

It would be understood that individual apertures 78 are provided for the rotatable elements 71, 72 and 73, respectively, and that the apertures prevent individual axial movement of the elements and retain the elements against such movement which would tend to misalign the elements with the thread 50 and with the tubular member 51, while at the same time accommodating the free rotation of the elements 71, 72 and 73, respectively, about their longitudinal axes.

In that modified form of the invention shown in Figures 10–17, inclusive, it will be noted that the only substantial difference resides in the utilization of rotatable elements 81, 82 and 83 which are of different design than the rotatable elements 71, 72 and 73 heretofore described. Also, the design of the carrier 90 is different from the carrier 75 hereinbefore described. Other than the differences in the rotatable elements and the carrier, the remainder of the mechanism is identical with that heretofore described.

Initially, it will be noted that all of the rotatable elements 81, 82 and 83 illustrated in Figures 10–17 are identical. Each of these elements includes a pair of radially enlarged, preferably toroidal portions 81a and 81b, in the case of the element 81, which are relatively closely spaced and which are separated by a reduced diameter portion 81c. An additional toroidal surface 81d is located in relatively greater spaced relation to the surface 81b and is joined thereto by a reduced diameter portion 81e. Terminal pintles are provided by reduced diameter portions 81f and 81g adjacent the extreme ends of the element 81, these terminal portions 81f and 81g terminating in arcuate abutment portions 81h and 81i, respectively. The elements 82 and 83 are identical with the element 81, and the reference numerals 82a through 82i and 83a through 83i refer to identical portions of the elements.

As best illustrated in Figures 11 through 16, the elements 81, 82, 83 are retained in cruciform openings indicated respectively at 85, 86 and 87. These apertures 85, 86, 87 are substantially the same form as the apertures 78 hereinbefore discussed, the apertures each including a central, enlarged, generally rectangular central portion 86a and 87a having reduced terminal portions 85b, 85c, 86b, 86c and 87b, 87c which snugly receive the reduced ends 81f, 81g, 82f, 82g, 83f and 83g.

It will be seen from a study of Figures 10–17, inclusive, that the elements 81, 82 and 83 are provided to cooperate with the grooves or recesses 61, 62 and 63 formed in the tubular element 51. The surfaces 81a and 81b of the element 81 are seated within the recess 61 in contact with the shoulders therein, the surfaces 82a and 82b of the element 82 are seated in the groove 62 to cooperate with the shoulders thereof, and the surfaces 83a and 83b of the elements 83 are seated in the groove 63 to cooperate with the shoulder thereof.

It will be noted that through the provision of the six rotatable elements, two of such elements are seated in each of the grooves. An additional radial thrust relation is obtained for each of the elements by the seating of the third toroidal surface in the adjacent groove. For example, the surfaces 81d of the elements 81 are seated in the groove 62, although out of contact with the shoulders thereof, the surfaces 82d are seated in the groove 63 in radial thrust relation only therewith, and the surfaces 83d of the elements 83 are seated in the groove 62, but only in radial thrust relation therewith.

*Operation*

The operation of the devices heretofore described will be readily apparent from an inspection of the drawings, but the following explanation is given for aiding in the understanding of the invention by those skilled in the art.

Operation of the motor within the motor casing 16 will cause rotation of the motor shaft 17 and corotation of the shaft 19 through its connection with the shaft 17 by the coupling 18. Rotation of the shaft 19 will, of course, effect rotation of the worm gear 21 which, through its meshing engagement with the pinion 23 and the keyed connection of the pinion 22 with the shaft 23, will cause rotation of the shaft 23. The rotational loads imposed on the shaft 23 by its rotation will be taken up by the plain bearing 30 at one end thereof, and by the bearing elements 43 contacting a medial portion of the shaft. In addition, end thrust upon the shaft 23 in either direction is taken up by the double thrust-bearing elements 40.

Rotation of the threaded portion 50 of the shaft will, of course, cause rotation of the elements 71, 72 and 73 about their individual longitudinal axes which are parallel to the axis of the threaded portion of the shaft. Rotation of these elements 71, through their thrust-bearing contact with the tubular element 51, will cause movement of the tubular element 51 longitudinally of the shaft. Since the element 51 is held against rotation by the engagement of the device to be actuated with the tubular element 51, as at the apertures 53, the tubular element 51 will move only axially with relation to the shaft 50.

This telescopic movement of the element 51 with relation to the shaft is accomplished primarily through the axial thrust contact between the portions 71a, 71b, 72a, 72b, 73a and 73b with the shoulders 61a, 61b, 62a, 62b, 63a and 63b respectively. More particularly, this axial movement is brought about by the fact that the thread 50 has an appreciable longitudinal or axial lead; rotation of the thread will necessarily force the elements 71, 72 and 73 to travel axially thereof, and this axial travel of the elements 71, 72 and 73 is translated into axial movement of the tube 71 by virtue of the axial thrust contact therebetween. Radial loads between the shaft 50 and the tubular element 51 are distributed across all of the radially enlarged, preferably toroidal surfaces 71a, 71b, 71c and 71d of the element 71 and the corresponding surfaces of the elements 72 and 73.

By virtue of the characteristic of the threaded shaft when engaging elements, such as the elements 71, 72 and 73, the elements are subjected to a rotational force causing them to rotate about the axis of the shaft 50, as well as longitudinal or axial movement along the length of the shaft. This rotational movement of the elements 71, 72 and 73 causes the elements to rotate about the axis of the shaft. This motion is in the nature of a planetating motion, and this motion will cause the carrier element 75 to planetate also. This planetating movement, insofar as being converted into useful axial movement of the element 51, is lost motion, and this lost motion will result in a speed difference between the rotational speed of the shaft and that axial movement of the collar or tube 51 which would be expected from a mathematical analysis of the thread lead when converted into longitudinal motion. Thus, the shaft 51 is moved axially at a reduced speed. Of course, this planetating motion of the elements 71, 72 and 73 is not really lost, but is actually picked up as a mechanical advantage. Under these circumstances, the combination of shaft 50, elements 71, 72, 73, carrier 75 and tube 51 function as a planetary gear train, in which the thread 50 is the sun gear, the elements 71, 72 and 73 are the planetating pinions, the carrier 75 is the element of a planetating pinion carrier, and the tubular element 51 is the equivalent of a ring gear.

Because of this analogy to a planetary gear set, and the planetating action of the carrier 75 and the elements 71, 72 and 73, it will be obvious that the present invention not only translates rotational movement into longitudinal or axial movement, but that an actual speed change occurs within the operating mechanism.

When the element 51 is being moved axially from the shaft flange 52, the axial thrust upon the element 51 is transmitted through the surfaces 17b, 72b and 73a, so that the thrust load is carried by a portion of each of the rotatable elements. Conversely, when the tubular element 51 is being moved toward the flange 52, the axial thrust is transmitted through the surfaces 71a, 72a and 73b. The forces upon these three element surfaces are uniformly distributed radially of the tubular element 51, and axially between the elements 71, 72 and 73. Radial loads between the threads 50 and the tubular element 51 are distributed over all of the four toroidal surfaces of all of the three elements, thus, any one element surface carries one-twelfth of the radial load between the telescoping members.

In that embodiment of the invention illustrated in Figures 10–17, inclusive, certain advantages will immediately become apparent. The utilization of the six elements results in distributing the axial thrust load among six surfaces, rather than three, and the distribution of the radial load over eighteen surfaces, rather than twelve. Additionally, the elements 81, 82 and 83 are all identical in construction, yielding an additional advantage in manufacturing economy and convenience. It will be appreciated that the principles of operation are identical for the two different embodiments of the invention.

Figures 9 and 17 present a graphic analysis of the axial thrust forces which are involved in the operation of the two different modified embodiments of the present invention. In each case, the solid arrow represents the movement of the collar 51 outwardly relative to the shaft, i.e., away from the flange 52, while the dotted-force line represents the movement of the tubular element 51 in the opposite direction, i.e. toward the flange 52.

From the foregoing description, and the explanation of the operation of the present invention, it will be appreciated that the present invention provides an improved, new, and extremely useful motion-translating device, wherein rotary motion may be translated into linear motion, or conversely, linear motion may be converted into rotary motion, and at a changed speed. The speed-changing characteristics of the present invention are particularly useful, inasmuch as they provide the means whereby a relatively simple initial speed-changing mechanism, such as the worm 21 and the pinion 22, may be utilized for first reducing the speed of rotation of a motor-driven shaft, with the planetating characteristics of the rotatable elements being utilized to further reduce the speed of rotation of the motor. At the same time, a definite force advantage is picked up, and the other advantages hereinbefore pointed out are obtained.

It will, of course, be understood that various details of construction may be changed through a wide range without departing from the principles of this invention, and it is, therefore, not the purpose to limit the patent granted hereon otherwise than necessitated by the scope of the appended claims.

I claim:

1. A motion-converting drive unit comprising telescoping driving and driven members, one of said members being threaded and the other of said members having a plurality of annular interior recesses in the inner periphery thereof, a rotatable element interposed between said members, said element having at least three radially enlarged bearing surfaces, at least two of said bearing surfaces engaging one of said recesses in said other member and at least one other of said bearing surfaces engaging another of said recesses, and means for positioning said element between said members whereby rolling contact of the rotatable element with the said members converts rotary movement of the one member into linear movement of the other member.

2. A motion-converting drive unit including an elongate driving member having a peripheral groove, a tubular member having an internal groove receiving the driving member adjacent the peripheral groove, bearing elements disposed between the driving member and the tubular member and having an enlarged bearing surface simultaneously engaging both of said grooves, a driven member telescoping the driving member, one of said telescoping members being threaded and the other of said telescoping members having an annular thrust shoulder, and a rotatable element interposed between the telescoping members and having a surface portion contacting the thread of said one member and the shoulder of said other member, rolling contact of the rotatable element with said telescoping members converting rotary movement of one member into linear movement of the other member.

3. A power-transmission unit comprising a shaft having unthreaded and threaded portions, the unthreaded portion having a continuous peripheral groove, a casing disposed about the unthreaded portion of the shaft having a continuous internal groove and being adapted for relative rotary movement with the shaft, elongate bearing elements disposed between the casing and shaft longitudinally thereof and having a radially enlarged bearing surface simultaneously engaging both of the grooves to effect said relative rotary movement between the casing and shaft, a sleeve telescopically receiving the threaded portion of the shaft, said sleeve being provided with a radially directed interior thrust shoulder, a plurality of rotatable elements interposed between the shaft and sleeve, said elements each having at least one radially enlarged toroidal surface portion snugly engaging the threaded portion of said shaft and the interior shoulder of said sleeve, and a carrier member also interposed between said sleeve and said shaft and retaining said rotatable elements in peripherally spaced relation whereby rotation of the shaft causes said rotatable elements to travel axially of the shaft and abutment of said elements with said shoulder causes the sleeve to travel therewith.

4. A power-transmission unit including a shaft having a continuous peripheral groove at one portion thereof and a spiralling threaded groove at another portion thereof, a housing disposed about the continuous groove of the shaft, race means within the housing providing a continuous groove transversely thereof, said last-mentioned groove being substantially aligned radially of the shaft with the continuous groove, elongate bearing elements directed axially along the shaft and disposed about the shaft and between the shaft and housing, said elements having radially enlarged bearing surfaces simultaneously engaging the groove of the race means and the continuous groove of the shaft to effect relative rotary movement between the housing and shaft and absorb endwise thrust between said parts, a sleeve telescopically receiving the spiralling threaded portion of the shaft, said sleeve having a plurality of axially spaced interior recesses provided with radially directed interior thrust shoulders, a plurality of rotatable elements interposed between said threaded portion of the shaft and said sleeve, said rotatable elements each having one radially enlarged toroidal surface portion snugly engaging the threaded portion of the shaft and one of the interior shoulders of the sleeve, each of said elements having an additional axially spaced radially enlarged surface portion entered in another of said recesses in snug radial thrust relation thereto, and a carrier member also interposed between the sleeve and shaft and retaining said elements in peripherally spaced relation whereby rotation of the shaft causes said rotatable elements to travel axially of the shaft and abutment of said elements with said shoulders causes the sleeve to travel therewith.

5. A low-friction, motion-converting drive unit including a driving member having a pair of continuous peripheral grooves, a housing disposed about said grooves, race means stationed within the housing and defining a groove disposed transversely of the housing and having shoulder portions, said groove of the race means being substantially aligned transversely of the housing with the grooves of the driving member, elongate bearing elements disposed about the driving member and between said member and the housing longitudinally thereof, each of said elements having a pair of radially enlarged bearing surfaces spaced axially of the element, said bearing surfaces engaging the peripheral grooves of the driving member adjacent the outer extremities of said surfaces to effect relative rotary movement between the housing and driving member and said bearing surfaces engaging the shoulder portions of the groove of the race means adjacent the sides of the outer extremities of said surfaces to absorb axial thrust between the housing and driving member, a driven member telescopically associated with the driving member, one of said telescoping members being threaded and the other of said telescoping members having an annular thrust shoulder, a plurality of peripherally spaced rotatable elements interposed between said telescoping members and each having surface portions contacting the thread of said one member and the shoulder of said other member, and a carrier also interposed between said members and operatively engaging said rotatable elements to retain the elements in peripherally spaced relation, rolling contact of the rotatable elements with said telescoping members converting rotary movement of the one member into linear movement of the other member.

References Cited in the file of this patent

UNITED STATES PATENTS

| | | |
|---|---|---|
| 2,445,384 | Bousky | July 20, 1948 |
| 2,446,393 | Russell | Aug. 3, 1948 |
| 2,714,005 | Wise | July 26, 1955 |

FOREIGN PATENTS

| | | |
|---|---|---|
| 692,431 | France | Nov. 5, 1930 |
| 995,011 | France | Nov. 26, 1951 |